July 21, 1931.   S. G. RUSSELL   1,815,382
FISHING REEL
Original Filed Sept. 19, 1928
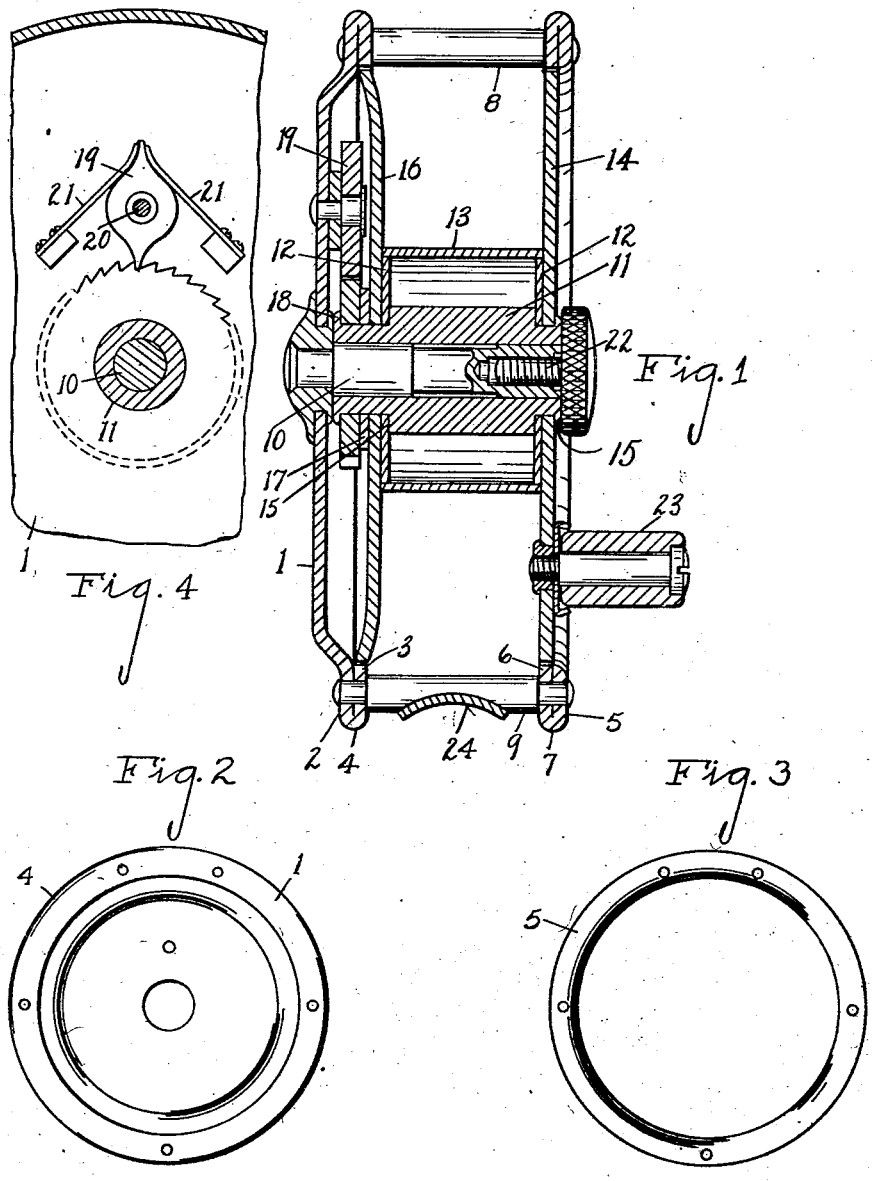
INVENTOR
Samuel G Russell
BY
Chappell Earl
ATTORNEYS Patented July 21, 1931

1,815,382

UNITED STATES PATENT OFFICE

SAMUEL G. RUSSELL, OF KALAMAZOO, MICHIGAN, ASSIGNOR TO SHAKESPEARE COMPANY, OF KALAMAZOO, MICHIGAN

FISHING REEL

Application filed September 19, 1928, Serial No. 306,795. Renewed March 28, 1931.

The main objects of this invention are:

First, to provide a fishing reel which may be formed of very light material, mainly of sheet aluminum, and at the same time is compact, of large capacity and is strong and rigid.

Second, to provide a fishing reel which may be formed of sheet material and at the same time has the appearance of a die cast structure or one made of heavier material.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary vertical section of my improved reel, parts being shown in full lines for convenience in illustration.

Fig. 2 is an inside view of one of the end members of the frame.

Fig. 3 is an outside view of the other end member.

Fig. 4 is a fragmentary view illustrating the arrangement of the click.

In the drawings similar reference characters refer to similar parts throughout the several views.

My improved fishing reel comprises a dished plate-like end member 1 formed of sheet metal and having a flat peripheral portion 2, the edge 3 of this flat peripheral portion being turned inwardly upon itself providing a thickened reinforcing rim having a rounded peripheral edge 4.

The end member 5 is annular, this member being folded inwardly upon itself, the inner edge of the infolded portion 6 being substantialy flush with the inner edge of the outer portion. The inner edge of the outer portion of this member 5 is preferably outwardly beveled. This folding of the member 5 upon itself provides a rounded peripheral edge 7 corresponding to the peripheral edge 4 of the member 1. These members are connected by shouldered pillars 8 and 9, the ends of the pillars being preferably upset or riveted, permanently connecting the parts and providing a rigid frame.

The spool spindle 10 is mounted on the end member 1. The spool in the embodiment illustrated comprises a shouldered hub 11 having discs 12 mounted thereon and supported by the shoulders to fit within the barrel 13, centering and supporting the barrel in the spool.

The spool flange 14 is arranged on the shouldered portion of the hub at the outer end thereof, the hub being upset at 15 to secure these parts in assembled relation. The inner spool flange 16 is preferably dished, coacting with the dished end plate-like member and providing a housing for the click pinion and coacting click or detent, a spacing washer-like ring 17 being arranged between the flange 16 and the click pinion. The end of the hub is upset at 18 upon the pinion, thereby securing these parts in assembled relation.

The detent or click 19 is mounted on the pivot 20, a pair of springs 21 acting to yieldingly hold the detent in position.

The flanges of the spools are arranged with their peripheries within the infolded edges of the end members, as shown in Fig. 1.

The screw 22 is threaded into the end of the spool spindle to overlap the hub, thereby retaining the spool in position.

The handle 23 is secured to the spool flange 14.

A reel seat 24 is carried by the pillar 9.

My improved reel may be formed of very light material; at the same time it is strong and rigid and of large capacity. This is a very desirable feature for certain kinds of fishing and is not obtained in the conventional type of reel at present on the market.

I have illustrated and described my improvements in an embodiment which I have found very satisfactory. I have not attempted to illustrate and describe other embodiments or adaptations which I contemplate as it is believed that this disclosure will enable those skilled in the art to embody or adapt my improvements as may be desired.

Having thus described my invention, what I claim as new and desire to secure by Letters Patent, is:

1. In a fishing reel, the combination of a frame comprising a dished end member having a flat peripheral portion folded inwardly upon itself reinforcing the end member and providing a spool flange recess, an annular end member folded inwardly upon itself, the infolded portion providing a spool flange recess, the inner edge of the outer portion of said annular end member being outwardly beveled, pillars arranged through and secured to the said folded portions of said end members, a spool spindle carried by said dished end member, a spool rotatable on said spindle and comprising a shouldered hub, a tubular barrel, a pair of barrel supporting discs arranged on said hub against said shoulders and fitting within said barrel, a pair of spool flanges arranged on said hub at the outer side of said barrel supporting discs with their peripheries within said flange recesses of said end members, the inner of said flanges being dished, the outer being flat, a click pinion arranged on said hub at the concave side of said dished flange, the ends of said hub being upset to secure the spool parts in assembled relation, a click mounted on the inner side of said dished end member to coact with said click pinion, a spool retaining member threaded into the end of said spindle to overlap said spool hub, and a handle secured to the outer of said spool flanges.

2. In a fishing reel, the combination of a frame comprising a dished end member having a flat peripheral portion folded inwardly upon itself reinforcing the end member and providing a spool flange recess, an annular end member folded inwardly upon itself, the infolded portion providing a spool flange recess, pillars arranged through and secured to the said folded portions of said end members, a spool spindle carried by said dished end member, a spool rotatable on said spindle and comprising a shouldered hub, a tubular barrel, a pair of barrel supporting discs arranged on said hub against said shoulders and fitting within said barrel, a pair of spool flanges arranged on said hub at the outer side of said barrel supporting discs with their peripheries within said flange recesses of said end members, the inner of said flanges being dished, the outer being flat, a click pinion arranged on said hub at the concave side of said dished flange, a click mounted on the inner side of said dished end member to coact with said click pinion, and a handle secured to the outer of said spool flanges.

3. In a fishing reel, the combination of a frame comprising a dished end member, an annular end member and connecting pillars therefor, a spool spindle carried by said dished end member, a spool rotatable on said spindle and comprising a shouldered hub, a tubular barrel, a pair of barrel supporting disks arranged on said hub against said shoulders and fitting within said barrel, a pair of spool flanges arranged on said hub at the outer side of said barrel supporting disks the inner of said flanges being dished, the outer being flat, a click pinion arranged on said hub at the concave side of said dished flange, the ends of said hub being upset to secure the spool parts in assembled relation, a click mounted on the inner side of said dished end member to coact with said click pinion, a spool retaining member threaded into the end of said spindle to overlap said spool hub, and a handle secured to the outer of said spool flanges.

4. In a fishing reel, the combination of a frame comprising a dished end member, an annular end member and connecting pillars therefor, a spool spindle carried by said dished end member, a spool rotatable on said spindle and comprising a shouldered hub, a tubular barrel, a pair of barrel supporting disks arranged on said hub against said shoulders and fitting within said barrel, a pair of spool flanges arranged on said hub at the outer side of said barrel supporting disks, the inner of said flanges being dished, the outer being flat, a click pinion arranged on said hub at the concave side of said dished flange, a click mounted on the inner side of said dished end member to coact with said click pinion, and a handle secured to the outer end of said spool flanges.

5. In a fishing reel, the combination of a frame comprising a plate-like end member, an annular end member and connecting pillars, a spool spindle carried by said plate-like end member, a spool rotatable on said spindle and comprising a shouldered hub, a tubular barrel, a pair of barrel supporting disks arranged on said hub against said shoulders fitting within said barrel, a pair of spool flanges arranged on said hub at the outer sides of said barrel supporting disks, a click pinion arranged on said hub at the inner side of the flange adjacent said plate-like end member, the ends of said hub being upset to secure the spool parts in assembled relation, a click mounted on the inner side of said plate-like end member to coact with said click pinion, a spool retaining member threaded into the end of said spindle to overlap the spool hub, and a handle secured to the outer of said spool flanges.

In witness whereof I have hereunto set my hand.

SAMUEL G. RUSSELL.